Sept. 13, 1960 H. TÖPFER 2,952,743
CONTROL OF THE OPERATION OF SWITCHES IN COMMUNICATION SYSTEMS
Filed March 4, 1959 5 Sheets-Sheet 1

Inventor:
Herbert Töpfer
By. [signature]
Atty.

*Inventor:*
*Herbert Töpfer*
*By* [signature] *Atty.*

CONTROL OF THE OPERATION OF SWITCHES IN COMMUNICATION SYSTEMS

Filed March 4, 1959 5 Sheets-Sheet 3

Inventor.
Herbert Töpfer
By [signature] Atty.

*Inventor:*
*Herbert Töpfer.*
*By* [signature] *Atty.*

Sept. 13, 1960 H. TÖPFER 2,952,743

CONTROL OF THE OPERATION OF SWITCHES IN COMMUNICATION SYSTEMS

Filed March 4, 1959 5 Sheets-Sheet 5

Inventor:
Herbert Töpfer
By [signature] Atty 2,952,743

CONTROL OF THE OPERATION OF SWITCHES IN COMMUNICATION SYSTEMS

Herbert Töpfer, Munich, Germany, assignor to Siemens and Halske Aktiengesellschaft Berlin and Munich, a corporation of Germany Filed Mar. 4, 1959, Ser. No. 797,099

Claims priority, application Germany Mar. 10, 1958

7 Claims. (Cl. 179—18)

Figure 1A:
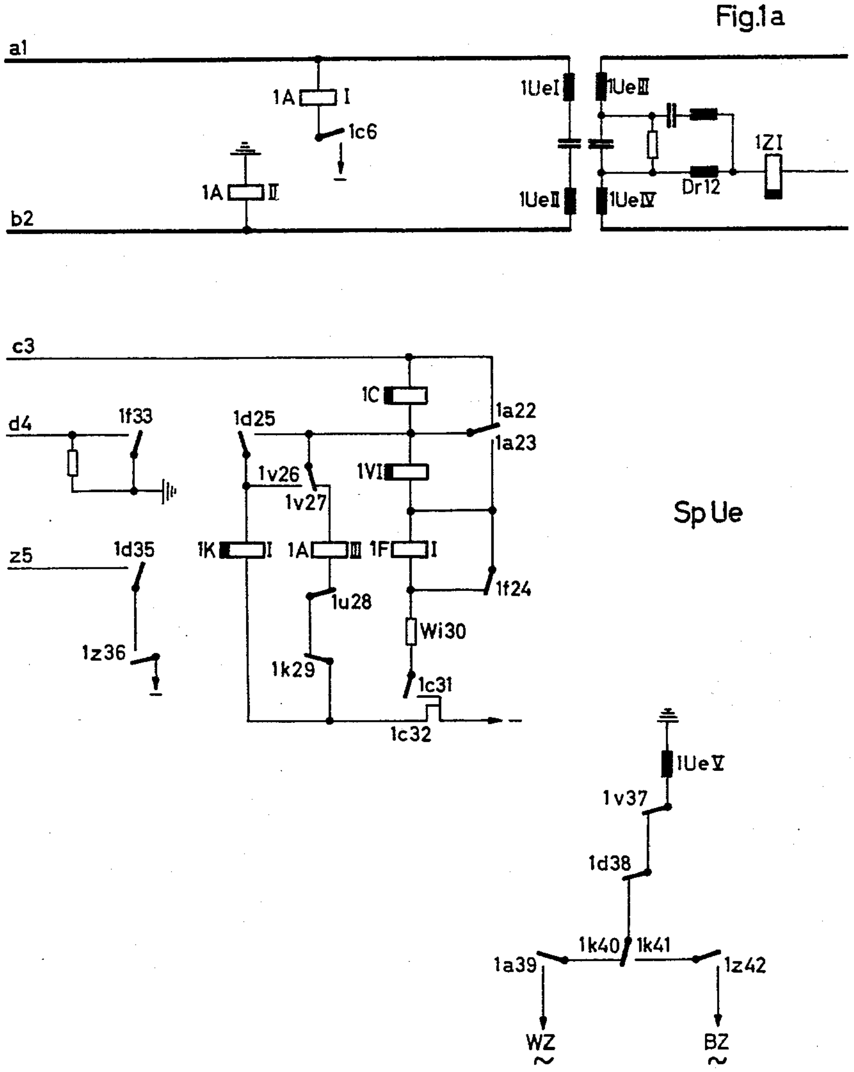

This invention relates to the control of the operation of switches in communication systems, especially telephone systems, and is particularly concerned with a circuit arrangement for stopping the operation of switches hunting for an idle line or trunk in a marked contact group in which all lines or trunks are busy.

It is known in connection with switches, particularly rotary switches having in the contact bank thereof a plurality of serially related differently numbered contact groups, to cause such switches to move their wipers at the end of each contact group to a special overrun position when all lines or trunks included in the marked contact groups are busy.

It is further known to cause switches, without using special overrun positions, to stop with their wipers on the bank contacts of the first line or trunk following a marked contact group, when all lines of the marked contact group are busy, and to transmit in such a case busy tone to the calling party. This is effected, responsive to the switch wipers leaving the group contact marked by a setting device, by interconnecting all group marking conductors extending between the setting device and the switch to be set. The switch can in this manner be stopped with the wipers in engagement with the group marking contact following the marked contact group, utilizing the original marking circuit. The corresponding system and arrangement unnecessarily prepares all group marking contacts to function as overrun positions, thus requiring a considerable number of relay contacts and corresponding relays.

The invention, without resorting to such expenditure, effects the stopping of the operation of the connecting switch with the switch wipers likewise in engagement with the bank contacts of the first step of the contact group following the marked contact group, when all lines of the marked contact group are busy, by causing the relay chain of the setting device, provided for counting the incoming impulses, to switch the marker circuit after marking of the desired contact group, by switching means automatically in local circuits to the group contact of the next accessible contact group.

In accordance with a further object and feature of the invention, after the marking of the desired contact group, a local impulse is by the impulse transmission relay produced for the relay counting chain of the setting device, resulting in a changed condition of the counting chain which effects switching over of the marking circuit in the setting device from the initially marked contact group to the group contact of the next following contact group. This impulse may correspond to the impulse pause of the incoming selection impulses and may be produced by the energization of the impulse receiving relay; however, it may also correspond to a selection impulse and may be produced responsive to restoration of the impulse receiving relay.

The various objects and features of the invention will be brought out in the course of the description of an embodiment of the invention which will be rendered below with reference to the accompanying drawings showing the invention incorporated in a telephone system comprising individual storers for the occupied connection paths, disposed at the incoming end of connections and provided with central marker devices in the individual selection stages.

Figure 3:
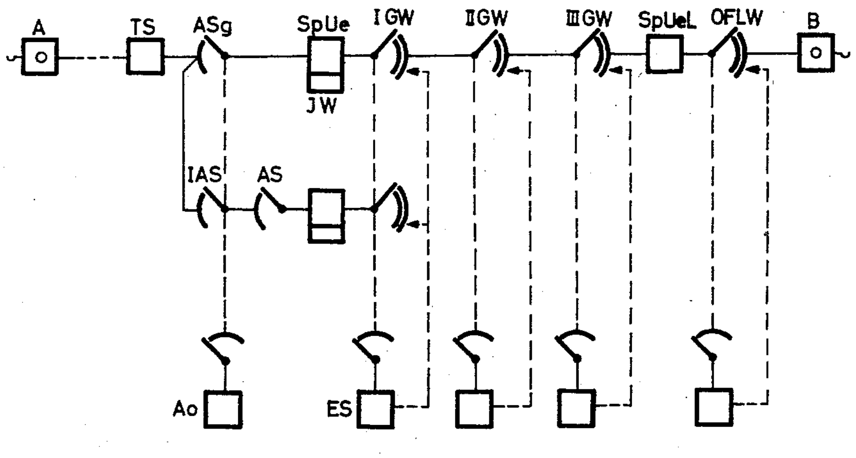

The telephone system in question will first be explained with reference to the block diagram shown in Fig. 3.

Figure 1B:
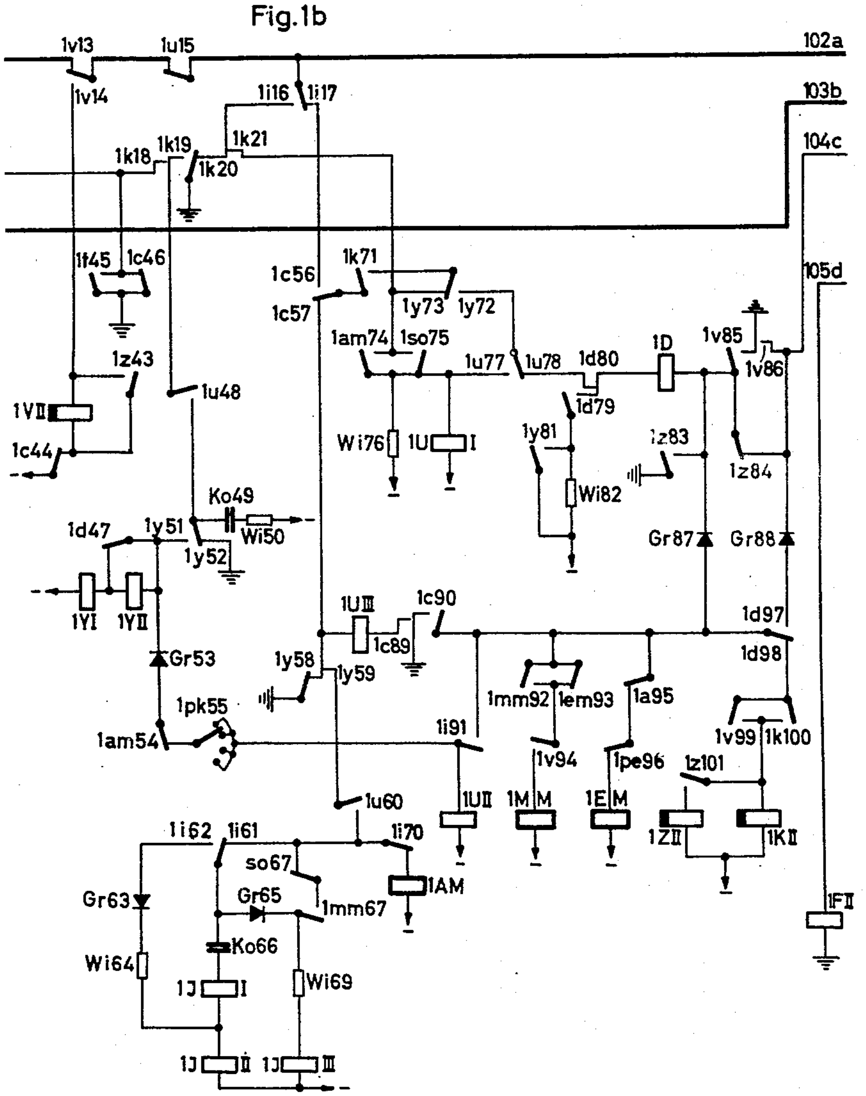
Figure 2A:
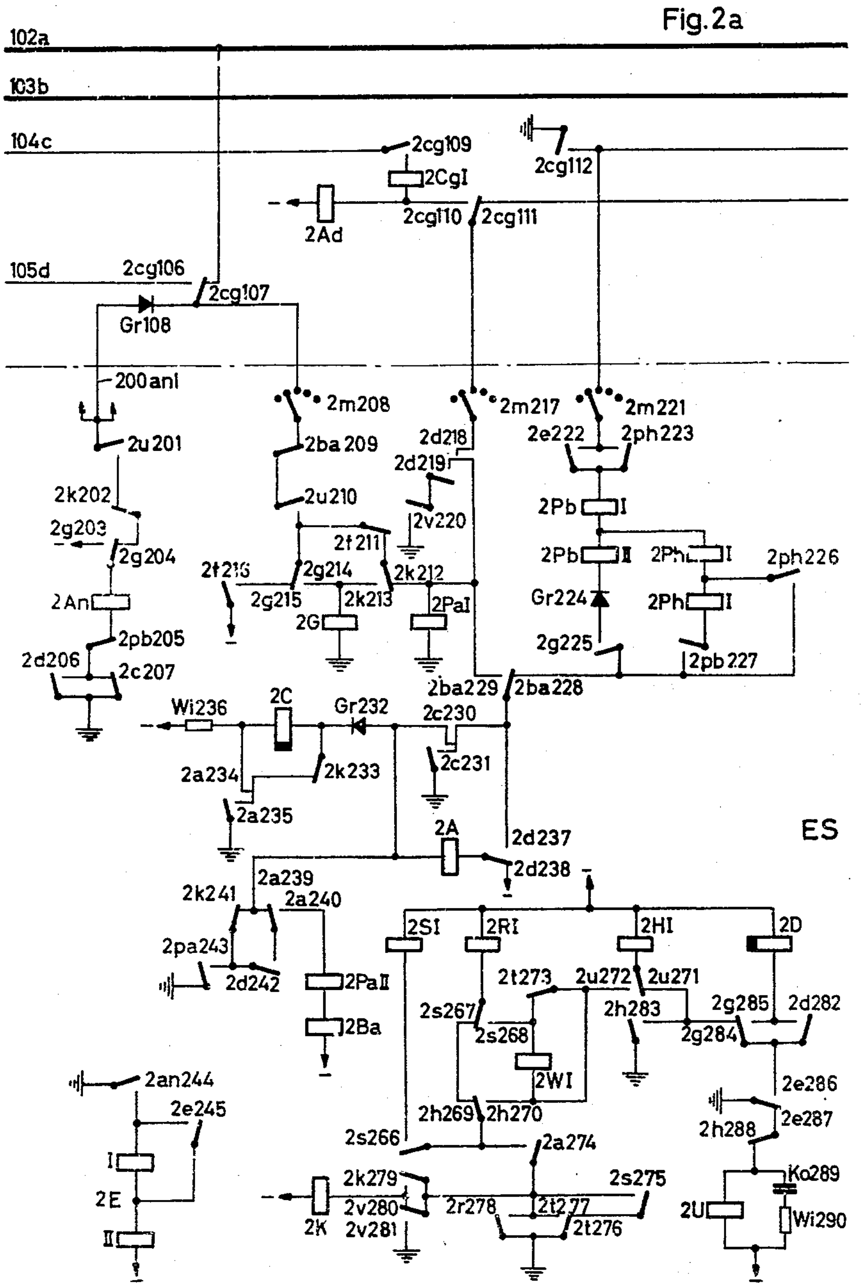
Figure 2B:
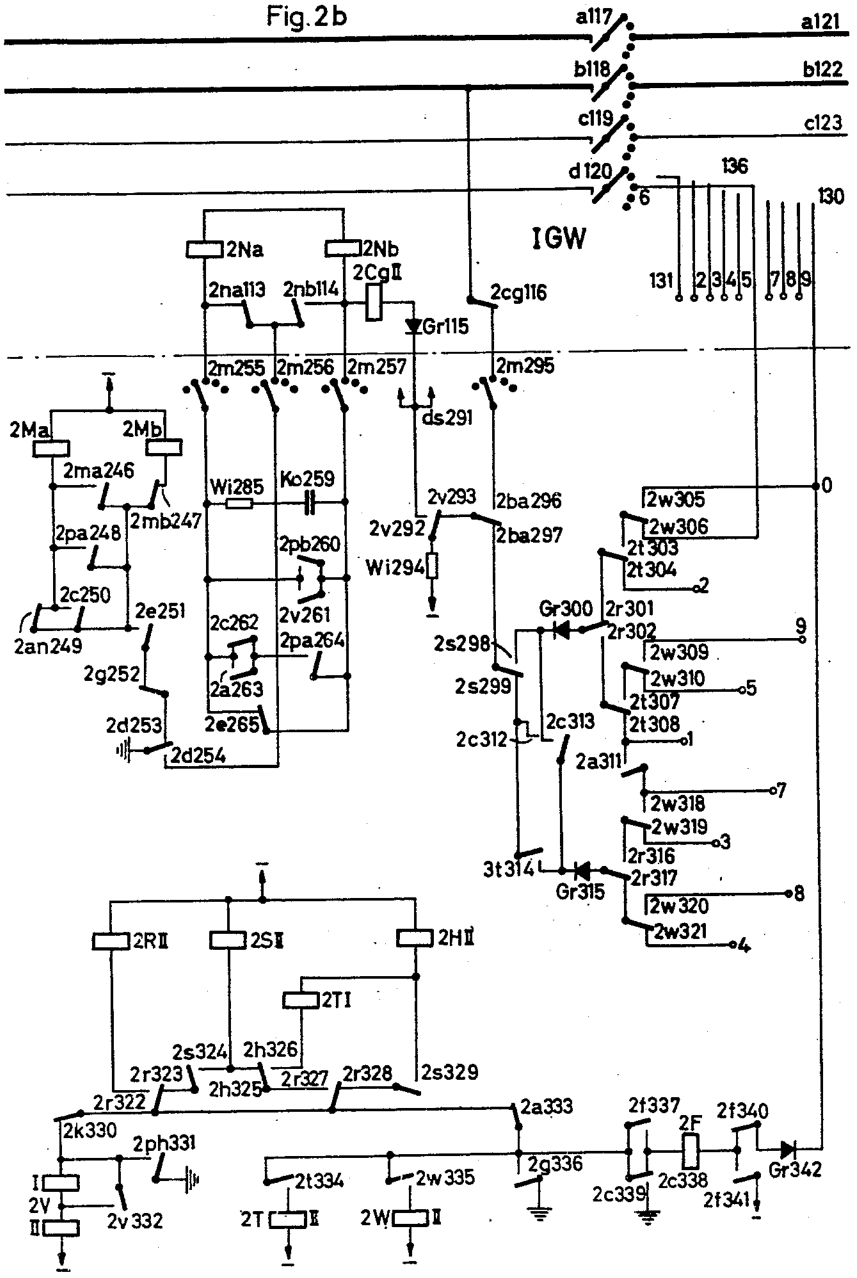

The calling subscriber A is in usual manner connected to a two-conductor line which terminates in the exchange in a subscriber line circuit TS. When the calling subscriber removes his receiver to extend a call, his line is in known manner operatively connected by means of the call finder AS*g* which operates responsive to a call signal. Calling lines may of course also be connected by way of two call finder stages IAS and IIAS. Central alloters A*o* are in customary manner associated with each call finder stage. Each call finder, for instance the call finder AS*g* is connected with a first group selector IGW. In each of these connection paths of a call finder group selector set, there is connected a supply transformer S*p*U*e* with an associated electromechanical storer JW, the latter hereinafter called the impulse repeater. The impulse repeater stores the train of number impulses received and delivers them without conversion. The circuit details of this arrangement are shown in Figs. 1*a* and 1*b*. A marker device ES, hereinafter called the setting set, is associated jointly via a connecting selector with a group of first group selectors. Figs. 2*a* and 2*b* show the switching details for the setting set and the first group selector. From the first group selector the call extends, if required via a second group selection stage IIGW, which again has a common setting set, and furthermore over a third group selector stage IIIGW, which also has a common setting set, and finally over a battery feed-repeater S*p*U*e*L to the connector OFLW. The connector stage also has a common setting set associated with it.

The switching operations which occur for establishing a connection will now be described in detail with reference to Figs. 1*a*, 1*b*, 2*a* and 2*b*, insofar as they are of importance for an understanding of the present invention.

Figs. 1*a* and 1*b* show the supply transmission for the calling subscriber and the storage device for storing the train of pulses sent out by the subscriber. The storage device has laminations which are arranged in a circle and are pushed below a guide ring by a marker magnet corresponding to the number of pulses of a number. In each case, the last lamination remains standing above said guide ring and thus characterizes the end of a train of pulses. If for instance a train of pulses consists of seven impulses, the laminations 1 to 6 are pressed below the guide ring and the lamination 7 remains standing above the guide ring. Upon the feeding out of a series of pulses from this storing device, a switch arm 1*pk*55 is moved forward stepwise and upon coming against a lamination which is above the guide ring, closes a circuit for a relay which thereby characterizes the end of a train of pulses. Furthermore, the storage device also has normal-position contacts (off-normal contacts) *so*67 and *so*75, which are actuated on departure from normal position. The contact 1*pe*96 is opened when the end position is reached, that is, when the storage device is completely filled and interrupts the further receipt of the arriving current impulses.

The storage transmission shown in Figs. 1*a* and 1*b* is seized by the preceding connecting device, a call-finder, via the private conductor *c*3 as follows:

(1) +, . . ., *c*3-wire, 1*a*22, 1*v*27, 1AIII, 1*u*28, 1*k*29, 1*c*32, −

In this circuit, the relay 1A is attracted and by opening its contact 1*a*22 opens the short circuit for the seizure relay 1C which is thereby inserted in the circuit 1 and energizes. Furthermore, the winding V of the transformer 1U*e* is connected via contact 1*a*39 to the dial tone:

(2) +, 1U*e*V, 1*v*37, 1*d*38, 1*k*40, 1*a*39, WZ

The dial tone is transmitted inductively from the winding V to the windings I and II of the transformer 1U*e* and sent out from the latter via the line conductors *a*1 and *b*2 to the subscriber so as to cause him to start dialing. After energization of relay 1C the energization circuit for winding III of relay 1A is interrupted. Relay 1A is however held via its winding I and II and the subscriber loop in the following circuit:

(3) +, 1AII, *b*2-wire, subscriber loop, *a*1-wire, 1A1, 1*c*6, −

Via contact 1*c*90, ground potential is applied to the private conductor 104*c* leading to the successive connecting device:

(4) +, 1*c*90, G*r*87, 1*z*84, 104*c* conductor, . . .

Responsive to the dial tone, the subscriber now sends out by means of his dial the first series of impulses which, let us say, consists of six impulses. In the supply transmission, the impulse receiving relay 1A deenergizes in a pulse-like manner. Upon the first deenergization of the relay 1A, due to the opening of the contact 1*a*23, relay IV is connected via its winding I:

(5) +, . . ., *c*3-wire, 1*a*22, 1VI, 1*f*24, W*i*30, 1*c*31, −

By closing the contact 1*a*22, the seizure relay 1C is short-circuited, but is nevertheless held for a series of impulses, due to its delay in deenergizing. The seizure relay 1C, after the cutting off of its energizing circuit, was held in the following circuit:

(6) +, . . ., *c*3-wire, 1C, 1*a*23, 1*f*24, W*i*30, 1*c*31, −

After energization of the relay V by means of its contact 1*v*99, the relay 1K is energized which relay is held via its contact 1*k*100, independently of contact 1*v*99 in the following circuit:

(7) +, 1*c*90, 1*d*98, 1*k*100, 1KII, −

Furthermore, upon energization of relay 1K the dial tone is disconnected by the opening of the contact 1*k*40 and preparation is made for the sending out of a busy signal by the closing of the contact 1*k*41.

Upon the deenergization of the relay 1A, the storage magnet 1EM of the storage device is energized via concontact 1*a*95 in the following circuit:

(8) +, 1*c*90, 1*a*95, 1*pe*96, 1EM, −

The storage magnet 1EM is attracted and after energization of the relay A, the EM magnet which deenergizes shifts the laminations one step further. The off-normal contacts are thereby actuated. Minus potential lies, via contact 1*so*75 in the following circuit on the outgoing line conductor *a*102:

(9)

$-, \frac{1UI}{Wi76}$, 1*so*75, 1*y*75, 1*y*73, 1*k*71, 1*c*56, 1*i*17, 102*a* conductor, . . .

By the application of this voltage to the *a*102 conductor a setting set associated with the succeeding connecting device is excited. The relay 1U receives current insufficient to effect its operation while the individual set is being seized and can therefore not be attracted. At the end of the first impulse, the pulse receiving relay 1A is again attracted and by opening its contact 1*a*22, again connects the seizure relay 1C (cf. circuit 6) and, via its contact 1*a*23, short-circuits the relay IV which, however, due to its delayed deenergization, remains energized during a series of pulses. Furthermore, by the opening of the contact 1*a*95, the storage magnet 1EM is disconnected, which magnet, after deenergizing, energizes the marker magnet 1MM via contact 1*e*93:

(10) +, 1*c*90, 1*em*93, 1*v*94, 1MM, −

The marker magnet 1MM holds itself energized independently of the contact 1*em*93 by its own contact 1*mm*92 which is parallel to said last mentioned contact. After the second impulse the laminations are moved forward by one step further . The second lamination is thereby pressed by the marker magnet 1MM under the aforementioned guide ring. After the sixth pulse, the relay 1A remains energized so that relay 1V deenergizes with delay by the short-circuiting of its windings I by contact 1*a*23. After the deenergizing of relay V, the marker magnet 1MM is disconnected by the opening of the contact 1*v*94 so that the sixth lamination can no longer be pushed below the guide ring like the preceding five laminations. This lamination remains above the guide ring when the laminations are moved one step further forward upon the occurrence of the next train of pulses. The further trains of pulses which arrive are taken up by the storage device and stored in the same manner as already described.

As soon as one setting set seizes the succeeding connecting device, the high ohmic starting relay of said setting device which is connected to the 102*a* conductor is disconnected and via the low ohmic test relay which is now connected, an amplification of current is obtained so that the relay 1U in the storage device can energize via its winding I in accordance with circuit 9. Via contact 1*u*60 the de-storing magnet 1AM and the pulse transmitting relay 1J are energized in the following circuits:

(11) +, 1*y*58, 1*y*59, 1*u*60, 1*i*70, 1AM, −

(12) +, 1*y*58, 1*y*59, 1*u*60, 1*i*61, G*r*65, W*i*69, 1JIII, −

The relay 1J can however not be actuated since it is counter-energized via its windings I and II by the charging current for the capacitor K*o*66:

(13) +, 1*y*58, 1*y*59, 1*u*60, 1*i*61, K*o*66, 1JI, 1JII, −

As soon as the capacitor K*o*66 is charged, relay 1J is actuated via its winding III and holds itself, due to the discharge current K*o*66 in the following circuit:

(14) +(K*o*66), G*r*65, W*i*69, 1*j*III, 1JII, 1JI, −(K*o*66)

Furthermore, the capacitor further discharges in the following circuit:

(15) +(K*o*66), 1*i*62, G*r*63, W*i*64, 1JI, −(K*o*66)

During the time of actuation of the relay 1J, voltage is disconnected from the *a*102 conductor by the opening of the contact 1*i*17 (see circuit 9) and a pulse is thus transmitted to the setting set. Furthermore, by the opening of the contact 1*i*70, the destorage magnet 1AM is disconnected, which magnet, after it has deenergized, prepares a test circuit for the test wiper *pk*55 of the storer selector by closing the contact 1*am*54:

(16) +, 1*c*90, 1*i*91, 1*pk*55, 1*am*54, G*r*53, 1*d*47, 1YI, −

Since the second lamination is below the guide ring, this circuit is not closed, so that relay 1Y cannot energize. After the discharge of the capacitor K*o*66, relay 1J deenergizes and by closing its contact 1*i*17 again applies voltage to the 102*a* conductor (cf. circuit 9). Via contact 1*i*70, the destorage magnet 1A*m* is again energized and the charging circuit for the capacitor K*o*66 is again closed via contact 1*i*61. During the time in which relay 1J was energized, relay 1U was held via its winding II in the following circuit since the holding circuit for winding I was interrupted by the opening of the contact 1*i*17:

(17) +, 1*c*90, 1*i*91, 1UII, —

During the sending out of the sixth pulse, the test wiper *pk*55 is on the lamination located above the guide ring so that the energizing circuit for the relay 1Y (see circuit 16) is closed after the deenergization of the destorage magnet 1AM. Relay 1Y actuates and holds itself, independently of its holding circuit, in the following circuit:

(18) +, 1*k*19, 1*u*48, 1*y*51, 1*d*47, 1YI, —

By opening of contact 1*y*58 and 1*y*59, ground potential is removed from the pulse transmitting relay 1J and the destorage relay 1AM so that they can no longer energize. Via contact 1*y*72, relay 1U is held via its winding I in the following circuit:

(19) +, . . ., 102*a*-wire, 1*i*17, 1*c*56, 1*k*71, 1*y*72, 1*u*77, 1UI, —

After the setting of the succeeding connecting device of a first group selector to an idle outgoing line, ground potential is disconnected from the 102*a* conductor so that relay 1U deenergizes. After the deenergization of relay 1U, the holding circuit for relay 1Y (cf. circuit 18) is interrupted by the opening of the contact 1*u*48, but relay 1Y is held by the discharge current until the discharge of the capacitor K*o*49:

(20) +(K*o*49), 1*y*51, 1*d*47, 1YI(minus line), W*i*50, —(K*o*49)

Furthermore, via contact 1*u*78, relay 1D is connected to the 102*a* conductor in the following circuit:

(21) +, 1*c*90, G*r*87, 1D, 1*d*80, 1*u*78, 1*y*72, 1*k*71, 1*c*56, 1*i*17, 102*a* conductor, . . .

If the group selector has been set by the train of pulses sent out to an outgoing connecting device which operates in accordance with the same technique as described (pulse-wise interruption of the voltage), no voltage is present therein on the 102*a* conductor; relay 1D cannot energize. If there is concerned, however, a connecting device which is set by ground current pulses, this is made known by the placing of minus voltage on the 102*a* conductor, so that the relay 1D energizes.

By opening contact 1*d*38, the prepared connecting of the busy signal is interrupted. Relay 1D maintains itself independently of the energizing circuit in the following holding circuit:

(22) +, 1*c*90, G*r*87, 1D, 1*d*79, 1*y*81, —

By opening contact 1*d*47, the short-circuit for the winding II of the relay 1Y is interrupted, so that the relay 1Y deenergizes after discharge of the capacitor K*o*49. Furthermore, by opening contact 1*d*98, relay 1K is disconnected (cf. circuit 7). After the deenergization of relay 1K relay 1U is energized in the following circuit via the contacts 1*k*20 and 1*k*21 of relay 1K:

(23) $+, 1k20, 1k21, 1so75, \frac{1UI}{Wi76}, -$

Via relay 1*u*60, the destorage magnet 1AM (cf. current path 11) is energized, and the pulse transmitting relay 1J is connected (cf. circuits 12 to 15). As soon as the contact arm 1*pk*55 has reached the next marked lamination, relay 1Y energizes (cf. circuit 16) and interrupts the further transmission of pulses. Relay 1Y is held by the discharge current of the capacitor K*o*49 (cf. circuit 20) and deenergizes with a very strong time delay after discharge of the capacitor K*o*49 via winding 1YI and 1YII. The closing of contacts 1*y*58 and 1*y*59 initiates the sending out of the next train of pulses.

During the time of energization of the pulse transmitting relay 1J, a ground pulse is sent out in each case via the 102*a* conductor, by the application of ground:

(24) +, 1*k*20, 1*i*16, 102*a*-wire, . . .

After the sending out of all trains of pulses relay 1U is disconnected by the opening of the normal contact 1*so*75.

If the relay 1D does not operate, relay 1Y deenergizes and via its contact 1*y*73 connects voltage to the 102*a* conductor (cf. circuit 9) so as to obtain a setting set of the connecting device reached. After connection of a setting set, the destorage of the trains of pulses is introduced as already described. When all digits have been removed from the storage device, the normal contact 1*so*75 of the pulse repeater is interrupted and thus the start circuit for further setting sets is interrupted.

If the selector arranged in the succeeding connecting device does not find any idle outgoing connecting line, then after the stopping of the selector at a full-rotation step, voltage is applied to the 103*b* conductor. The metering relay 1Z is thereby energized via its winding I:

(25) +, 1*k*19, 1*k*18, 1ZI, D*r*.12, 1U*e*IV,103*b*-wire, . . ., —

By the opening of the contact 1*z*84, ground potential is removed from the 104*c* conductor (cf. circuit 4) and succeeding connecting device is thereby released. Relay 1Z holds itself, independently of its energizing circuit, via its winding II in the following circuit:

(26) +, 1*c*90, 1*d*98, 1*k*100, 1*z*101, 1ZII, —

By closing the contact 1*z*42, a busy signal is connected to the winding V of the transformer 1U*e*:

(27) +, 1U*e*V, 1*v*37, 1*d*38, 1*k*41, 1*z*42, busy signal From winding V, busy tone is transmitted to the calling subscriber via the windings I and II of the transformer 1U*e*. The busy signal causes the calling subscriber to release the seized connecting device by replacing the receiver.

Furthermore, when the selector stops at the full rotation step, the holding circuit for relay 1U (cf. circuit 19) is interrupted. After release of relay 1U, the holding circuit for relay 1Y (cf. current path 18) is opened by the opening of contact 1*u*48, relay 1Y however holding itself until the discharge of the capacitor K*o*49 in accordance with circuit 20.

As soon as the calling subscriber, as a result of the busy signal has replaced his receiver, the holding circuit for windings I and II of relay 1A (cf. circuit 3) is interrupted. Relay 1A deenergizes and via its contact 1*a*22 short circuits the winding of the seizure relay 1C which is thereby caused to deenergize with delay. During the restoring time of relay 1C, relay 1V can energize in accordance with circuit 5. Furthermore, the closure of contact 1*a*95, the storage magnet 1EM is connected in accordance with the circuit 8. As soon as relay 1V is energized and the seizure relay 1C has restored, relay 1K is held independently of the holding circuit via its winding II (cf. circuit 7) via its winding I:

(28) +, . . ., *c*3-wire, 1*a*22, 1*y*26, 1KI, 1*c*32, —

After the delayed release of the seizure relay 1C, the holding circuit for relay 1V is interrupted by the opening of the contact 1*c*31 so that relay 1V deenergizes. Furthermore, by the opening of contact 1*c*90, relay 1Z and the storage magnet 1E*m* are disconnected. By the closure of contact 1*c*27, relay 1U is energized via its winding I in the following circuit:

(29) $+, 1y58, 1c57, 1k71, 1y73, 1so75, \frac{1UI}{Wi76}, -$

Relay 1U actuates and via its contact 1*u*60, closes the circuit 11 for energizing the destorage magnet, 1AM and the circuits 12 and 13 for the pulse transmitting relay 1J. Relay 1J actuates, after the capacitor K*o*66 has been charged and holds itself until discharge of this capacitor in accordance with circuits 14 and 15. In the meantime, relay 1V releases and by opening the contact 1*v*26, interrupts the holding circuit for relay 1K (cf. circuit 28). After the delayed release of relay 1K, relay 1U is held in the following circuit instead of circuit 29:

$$(30)\qquad +,\ 1k20,\ 1k21,\ 1so75,\ \frac{1UI}{Wi76},-$$

Upon actuation of relay 1J, the destorage magnet 1A*m* is disconnected by the opening of contact 1*i*70. As soon as relay 1J releases after the discharge of the capacitor K*o*66, the charging circuit for this capacitor is again closed by the closing of contact 1*i*61 and the destorage magnet 1AM is again connected via contact 1*i*70. This interplay between the pulse transmitting relay 1J and the destorage magnet 1AM continues until, after reaching the normal position of the storage device, the normal contact 1*so*75 is opened and the holding circuit for relay 1U (cf. circuit 30) is thereby interrupted.

Relay 1U is however held during the time of energization of the destorage magnet 1A*m* by the contact 1*am*74 which lies in parallel to contact 1*so*75. After the actuation of the pulse transmitting relay 1J, the destorage magnet 1A*m* is disconnected by the opening of the contact 1*i*70, this magnet in its turn disconnecting relay 1U by the opening of contact 1*am*74. Relay 1U, by opening its contact 1*u*70, interrupts the energizing circuit for relay 1J and the destorage magnet 1AM.

Furthermore, via contact 1*u*28, the seizure circuit for the supply transformation S*p*U*e* shown is prepared (cf. circuit 1). The supply transformation is thus again in normal condition and can again be seized.

If however no busy signal is transmitted from the succeeding connecting device, then, as already mentioned, after the destorage of the last impulse by the opening of the contact 1*so*75, the circuit for obtaining a further setting set (cf. circuit 9) is interrupted.

If the connection is switched through to the subscriber line desired, and if the latter is idle, then during the release time of relay 1Y, voltage is applied to the 102*a* conductor by the succeeding connecting device so that relay 1D energizes via current path 21. Via contact 1*d*80, relay 1D closes a holding circuit for itself (cf. circuit 22). Via contact 1*d*97, ground is applied to the outgoing 104*c* conductor independent of circuit 4:

(31) +, 1*c*90, 1*d*97, G*r*88, *c*104 conductor, . . .

At the same time, due to the opening of the contact 1*d*98, the holding circuit for relay 1K (cf. circuit 7) is interrupted, so that relay 1K restores with time delay.

As soon as the called subscriber answers, voltage is applied to the 103*b* conductor by the succeeding connecting device (connector). No switching operations are thereby produced in the battery feed transformation, since the energizing circuit for relay 1Z is interrupted after the restoration of relay 1K (cf. circuit 25).

After completion of the conversation, the connection is released when the calling subscriber hangs up. The pulse receiving relay 1A restores (cf. circuit 3), since after the receiver has been hung up, the subscriber's loop is opened. By closing the contact 1*a*22, the winding of the seizure relay 1C is short-circuited and such relay 1C is thereby caused to restore with time delay. At the same time, by the opening of the contact 1*a*23, relay IV (cf. circuit 5) is connected. Furthermore, via contact 1*a*95, the circuit for energizing the storage magnet 1EM (cf. circuit 8) is closed. After actuation of relay 1V, relay 1D is held, independently of circuit 22 in the following circuit:

(32) +, 1*v*85, 1D, 1*d*79, W*i*82, −

Furthermore, ground is applied to the outgoing 104*c* conductor independently of circuit 31 via contact 1*v*86.

(33) +, 1*v*86, 104*c* conductor, . . .

After the delayed release of the seizure relay 1C, the circuit for the storage magnet 1EM is interrupted by the opening of the contact 1*c*90 so that the storage magnet restores. At the same time the holding circuit for relay 1D (cf. circuit 22) is interrupted, but relay 1D continues to hold itself in accordance with the circuit 32. Furthermore, after the opening of contact 1*c*90, ground potential would be removed from the 104*c* conductor if it were not connected in accordance with circuit 33 via contact 1*v*86 in order not to release the connection which has been made until the metering pulse has been transmitted. After the closing of contact 1*c*32, relay 1K can energize via its winding I in the circuit 28. Furthermore, a circuit for winding I of the metering relay 1Z is closed via contact 1*c*46:

(34) +, 1*c*46, 1ZI, *dr*.12, 1UIV, *b*103 conductor, . . .

Finally, after the release of relay 1C, the holding circuit for relay 1V (cf. circuit 5) is interrupted, by the opening of the contact 1*c*31, so that relay 1V restores with time delay. After energization of relay 1K, relay 1U is connected in accordance with circuit 29 by the closing of contact 1*k*71. Relay 1Z, by closing its contact 1*z*36, applies voltage to the *z*5 conductor:

(35) −, 1*z*36, 1*d*35, *z*5 conductor, . . .

After the energization of relay 1U the destorage magnet 1AM and the pulse transmitting relay 1J are connected via contact 1*u*60. There now take place exactly the same switching operations as already described in connection with the release after transmission of busy signal. After the delayed release of relay IV, the holding circuit for relay 1D (cf. circuit 35) is interrupted. At the same time, by the opening of contact 1*v*86, ground is removed from the outgoing 104*c* conductor. The succeeding connecting devices are in this manner released. As a result of the release of the succeeding connecting device, the voltage lying on the 103*b* conductor is disconnected and the metering relay 1Z releases (cf. circuit 34). It may be mentioned here that the relay 1D after energization of the metering relay 1Z was held, via contact 1*z*83, so that relay 1D after the release of relay 1Z also releases. By the opening of contact 1*z*36, the transmission of the metering impulse is terminated. As soon as relay 1D is released, relay 1K is caused to release by the opening of contact 1*d*25 over which, after the opening of contact 1*v*26, the holding circuit for winding I of relay 1K was maintained (cf. circuit 28). After relay 1K has restored, the seizure circuit (cf. circuit 1) is again prepared via contact 1*k*29 and the supply transformation can again be seized.

It may also be mentioned here that in case of long-distance calls, the long-distance marking relay 1F is caused to energize via its winding II over the 105*d* conductor. Independently of this energizing circuit, it holds itself by connecting its winding I after the opening of contact 1*f*24 over the incoming *c*3 conductor. By closing contact 1*f*33, the calling subscriber line is marked as being busy with a long-distance call by direct application of ground potential to the *d*4 conductor. Furthermore, a circuit for the metering relay 1Z is closed via contact 1*f*45. The metering current pulses are transmitted during the conversation by the application of voltage to the 103*b* conductor, so that relay 1Z can energize and transfer these metering pulses in circuit 35 to the charge meter of the calling subscriber. The release at the end of the conversation is the same as already described in connection with a connection to a subscriber of the same local network.

Figs. 2*a* and 2*b* show the first group selector and the central setting set ES belonging to the first group selector. With the setting set in normal position, the supervisory relay 2U is energized in the following circuit:

(101) +, 2*e*287, 2*h*288, 2U, −

Upon interruption of this holding circuit during the setting operation of the group selector, the supervisory relay 2U remains energized by the discharge current of the capacitor K*o*289. It releases only when the circuit is interrupted for an extended interval by a disturbance in the setting set.

By the application of voltage to the 102*a* conductor from the seized preceding battery feed transformation (Fig. 1, circuit 9), the setting set is caused to connect itself with the group selector. The starting relay 2A*n* energizes in the following circuit:

(102) +, 2*c*207, 2*pb*205, 2A*n*, 2*g*204, 2*k*202, 2*u*201, 200*an*1-wire, Gr108, 2*cg*107, 102*a* conductor, . . . , —

Voltage is applied to the 102*a* conductor in the preceding connecting device (cf. circuit 9). The starting relay 2A*n* by closing its contact 2*an*244 connects relay 2E which is held in the following circuit:

(103) +, 2*an*244, 2*e*,245, 2EII, —

The closing of contact 2*e*251 effects starting of the connecting selector which is a motor selector. The wipers of the selector are driven by two field coils 2M*a* and 2M*b* displaced by 90°, at the intersection of the axes of which there is rotatably supported an unwound armature which is rotated by the magnetic fields produced alternately in the field coils. The rotary motion of the armature is transmitted by a gearing to the selector shaft and thus to the wipers fastened thereto. By the cam contacts 2*ma*246 and 2*mb*247 controlled by the armature shaft, the field coils are alternately operatively connected. Simultaneous energization of both field coils places a braking force on the armature to stop further rotation of the wipers. In the position of the contacts shown, the field coil 2M*b* is energized upon the closing of the contact 2*e*251:

(104) +, 2*d*253, 2*g*252, 2*e*251, 2*mb*247, 2M*b*, —

By the magnetic field produced by the field coil 2M*b*, the armature is attracted and thereby placed in rotation. The cam contact 2*mb*247 is opened and the cam contact 2*ma*246 closed, so that the field coil 2M*a* is now excited:

(105) +, 2*d*253, 2*g*252, 2*e*251, 2*ma*246, 2M*a*, —

As soon as the armature is attracted by the magnet coil 2M*a*, the cam contact 2*mb*247 is closed and the cam contact 2*ma*246 opened, so that now again the field coil 2M*b* is traversed by current and in its turn again attracts the armature of the motor selector. As soon as the test wiper 2*m*208 of the selector reaches the contact to which, via the group selector, the preceding supply transformation is connected by which the setting set was started, the test relay 2P*a* responds via its winding I in the following circuit:

(106) +, 2P*a*1, 2*k*212, 2*f*211, 2*u*210, 2*ba*209, 2*m*208-arm, 2*cg*107, 102a-wire, . . ., —

As already mentioned, voltage lies on the 102*a* conductor in the preceding connecting device (cf. circuit 9) so that the test relay 2P*a* can energize and by closing its contact 2*pa*248 stop rotation of the wipers by simultaneous excitation of the two field coils. The field coil 2M*b* is energized in accordance with circuit 104 and the field coil 2M*a* in the following circuit:

(107) +, 2*d*253, 2*g*252, 2*e*251, 2*pa*248, 2M*a*, —

Furthermore, by the closing of contact 2*pa*243, relay 2A is energized:

(108) +, 2*pa*243, 2*k*241, 2A, 2*d*238, —

Relay 2A, by opening its contact 2*a*234, interrupts the short circuit for relay 2C and connects the latter via contact 2*a*235:

(109) +, 2*a*235, 2*k*233, 2C, W*i*236, —

Relay 2C closes its contact 2*c*250 and thus maintains the simultaneous energization of the two field coils of the selector independently of the contact 2*pa*248. Furthermore, by the opening of the contact 2*c*207, the holding circuit for the starting relay 2A*n* (cf. circuit 102) is interrupted. The starting relay 2A*n* releases and in its turn, by opening the contact 2*an* 244 disconnects relay 2E which, due to the short circuiting of its winding I via contact 2*e*245, releases with delay and by opening the contact 2*e*251, disconnects the energization circuit of the two field coils of the motor selector.

By connecting the low ohmic test relay 2P*a* in parallel to the high ohmic starting relay 2A*n*, the current flowing to the preceding connecting device is increased, and thereby the first train of pulses stored in the preceding connecting device is called for. The current pulses are transmitted as impulse-wise interruptions, that is, disconnection of the voltage lying on the 102*a* conductor via circuit 9, so that upon each pulse the test relay 2P*a*, which thus also operates as pulse receiving relay, deenergizes. When the test relay 2P*a* first releases, the circuit for relay 2A is interrupted by the opening of contact 2*pa*243 so that relay 2A also releases. By the opening of the contact 2*a*235, relay 2C is disconnected which relay, however, due to its short-circuit winding and furthermore, reinforced by the short-circuiting of its energizing winding over contact 2*a*234, remains attracted during the transmission of the pulses. By the closing of contact 2*a*333, relay 2V is connected via its windings I and II and this relay, after it has energized, is held in the following circuit:

(110) +, 2*c*339, 2*a*333, 2*k*330, 2*v*332, 2VII, —

Due to short-circuiting of winding I of relay 2V via contact 2*v*332, relay 2V remains actuated during the transmission of the train of pulses. At the end of the first pulse, 2P*a* is actuated and again connects relay 2A (cf. circuit 108). Via contact 2*a*235, relay 2C is again connected, while by the opening of contact 2*a*333, the circuit for relay 2V is interrupted. By the closing of contact 2*a*274, relay 2R is connected via its winding I:

(111) +, 2*v*281, 2*a*274, 2*h*269, 2*s*267, 2RI, —

It may be mentioned here that the relays 2H, 2R, 2S, 2T and 2W are stepped as counting chain relays by the incoming pulses and by their contacts, in the form of a contact pyramid, mark the selected decade onto which the group selector is to be set. At the beginning of the second pulse and after the release of relay 2A, relay 2S is connected by way of contact 2*a*333:

(112) +, 2*c*339, 2*a*333, 2*r*327, 2*h*325, 2SH, —

Relay 2R is held over its winding II:

(113) +, 2*c*339, 2*a*333, 2*r*322, 2RII, —

When at the end of the second pulse relay 2A is again actuated, relay 2S is held over its winding I:

(114) +, 2*v*281, 2*a*274, 2*s*266, 2SI, —

The energizing circuit for relay 2R (cf. circuit 111) is interrupted by the opening of contact 2*s*267. Upon the arrival of the third pulse, relay 2A again releases. Relay 2S is held by way of contact 2*a*333:

(115) +, 2*c*339, 2*a*333, 2*r*323, 2*s*324, 2SII, — and relay 2H is connected by way of contact 2*s*329:

(116) +, 2*c*339, 2*a*333, 2*r*328, 2*s*329, 2HII, —

When at the end of the third pulse relay 2A is again actuated, relay 2S is held in accordance with circuit 114 while relay 2H is held in the following circuit:

(117) +, 2*v*281, 2*a*274, 2*h*270, 2*u*272, 2HI, —

Furthermore, relay 2R is connected in the following circuit:

(118) +, 2*v*281, 2*a*274, 2*h*270, 2*t*273, 2*s*268, 2RI, —

Upon arrival of the fourth pulse, relay 2A again releases and by closing its contact 2a333, holds relay 2r (cf. circuit 113) and relay 2H. In the holding circuit for relay 2H, there is connected winding I of relay 2T so that this relay is also energized:

(119) +, 2c339, 2a333, 2r327, 2h326, 2TI, 2HII, —

Relay 2T is held in the following circuit independently of this energizing circuit:

(120) +, 2c339, 2t334, 2TII, —

At the end of the impulse, the holding circuit for relay 2R is interrupted by the opening of contact 2a333. Relay 2H is held via contact 2a274 (cf. circuit 117). As soon as relay 2A restores again upon the arrival of the fifth impulse, the holding circuit for relay 2H is also interrupted by the opening of contact 2a274 so that now relay 2T (cf. circuit 120) is energized. At the end of the pulse, relay 2R is energized via contact 2a274 (cf. circuit 111). Upon the restoration of relay 2A during the sixth impulse, relay 2R is held via circuit 113 and relay 2S is connected via circuit 112. At the end of the sixth impulse, relay 2S is held in accordance with circuit 114 and relay 2R restores. Since no further pulses arrive, the holding circuit for relay 2V (cf. circuit 110) remains interrupted, so that relay 2V releases with delayed action. After the release of relay 2V, relay 2K is connected via contact 2v280:

(121) +, 2t277, 2v280, 2K, —

After energization, relay 2K is held, independently of contact 2v280, by way of contact 2k979 parallel to the latter. By the opening of contact 2k212, relay 2Pa is disconnected (cf. circuit 106) and relay 2G is connected:

(122) +, 2G, 2k213, 2f211, 2u210, 2ba209, 2m208-arm, 2cg107, 102a-wire, . . ., —

As already repeatedly mentioned, voltage is present on the 102a conductor in the preceding connecting device (cf. circuit 9), so that relay 2G can energize. Furthermore, upon actuation of relay 2K, relay 2A is disconnected by the opening of contact 2k241, while relay 2C is disconnected by the opening of contact 2k233. Relay 2C, due to its short circuit winding, restores with time delay. Upon the release of relay 2A, relay 2S is held in the circuit 115 and relay 2H is connected via its winding II in accordance with circuit 116. The first step of the decade 6 is marked by way of contacts 2s298, 2r301, 2t303 and 2w306 of the contact pyramid.

Upon actuation of relay 2G, the contact 2g336 lying parallel to contact 2c339 is closed, so that relays 2T, 2S and 2H are held, despite the release of relay 2C and the opening of contact 2c339. After the delayed release of relay 2C, the starting relay 2An is again connected by way of contact 2c207:

(123) +, 2c207, 2pb205, 2An, 2g203, —

If instead of the digit 6, the digit 0 had been dialed, which digit signifies a long-distance call, then after the release of relay 2C, relay F which marks the long distance call will be energized in the following circuit:

(124) +, 2g336, 2c338, 2F, 2f340, Gr342, 2w305, 2t303, 2r301, Gr300, 2s298, 2ba297, 2v293, Wi294, —

Relay 2F is thereupon held in the following holding circuit:

(125) +, 2g336, 2f337, 2F, 2f341, —

The further switching operations initiated by the actuation of relay 2F will not be considered at this point.

By the energization of relay 2An (cf. circuit 123) relay 2E is connected by way of contact 2an244 and is held in accordance with circuit 103. The field coils 2Ma and 2Mb of the motor selector, despite the closing of the contact 2e251 are not energized, since their circuits are interrupted by the opening of contact 2g252. By the closing of contact 2e286, relay 2D is connected:

(126) +, 2e286, 2g285, 2D, —

Relay 2D after its actuation closes the contact 2d206 lying parallel to contact 2c207, so that the starting relay 2An after renewed actuation of relay 2C is held by way of this contact. The field coils 2Na and 2Nb of the group selector are connected over contact 2d254, these coils being alternately energized by way of the cam contacts 2na113 and 2nb114. In the illustrated position of the cam contacts, the field coil 2Na is energized in the following circuit:

(127) +, 2d254, 2m256-arm, 2na113, 2Na, —

After attraction of the armature by field coil 2Na, the cam contact 2na113 is opened and the cam contact 2nb114 is closed, so that the field coil 2Nb is now energized:

(128) +, 2d254, 2m256-arm, 2nb114, 2Nb, —

As soon as the wiper d120 of the group selector has reached the first step of the sixth decade, the test relay 2Pa is energized over its winding I and stops the motor selector:

(129) +, 2PaI, 2d218, 2n217-arm, 2cg111, d120-arm, 136-wire, 2w306, 2t303, 2r301, Gr300, 2s298, 2ba297, 2v293, Wi294, —

The two field coils 2Na, 2Nb are connected with each other via contact 2pa264 in the setting set and thus simultaneously energized so that the selector is stopped with its wipers at the first step which reached:

(130) 2Nb, 2m257-arm, 2pa264, 2c262, 2n255-arm, 2Na

Furthermore, upon energization of relay 2Pa via contact 2pa243, relay 2C is connected:

(131) +, 2pa243, 2d242, 2a239, Gr232, 2C, Wi236, —

At the same time a circuit for the test relay 2Pb is closed via contact 2pa243:

(132) +, 2pa243, 2d242, 2a239, 2c230, 2ba228, 2g225, Gr224, 2PbII, 2PbI, 2e222, 2m221-arm, c119-arm, c123-wire, . . .

This circuit is opened upon energization of relay 2C and the following circuit for the test relay 2Pb is closed by way of contact 2c231:

(133) +, 2c231, 2ba228, 2g225, Gr224, 2PbII, 2PbI, 2e222, 2m221-arm, c119-arm, c123-wire, . . . , —

If the succeeding connecting device which is connected to the first step is idle, the wiper c119 encounters voltage and the test relay 2Pb can energize in accordance with circuit 132. If however the first step is occupied, then after actuation of relay 2C, by the opening of contact 2c262, the simultaneous energization of the two field coils 2Na and 2Nb will be interrupted (cf. circuit 130) so that the selector wipers are moved further by the alternate energization of the two field coils. The selector thus hunts in the marked decade until it finds an idle line; if all lines are busy, it comes to the first contact of the next following decade as over-run ("eleventh step") position. After its wipers have left the first step, the holding circuit for the test relay 2Pa is interrupted so that this relay deenergizes. By the opening of contact 2pa243, the short circuit for relay 2A is interrupted so that it can again energize in series with relay 2C:

(134) +, 2c231, 2d237, 2A, Gr232, 2C, Wi236, —

Furthermore, by the opening of contact 2pa264, after actuation of relay 2A, a circuit is prepared for the stopping of the motor selector upon reaching full rotation (11th) step.

By the actuation of relay 2A, the counting relay chain for the marking of the decades is stepped further, that is, the marking line of the next decade is connected. Before energization of relay 2A, the relays 2S and 2T were held in the circuits 115 and 120. The holding circuit for relay 2S is interrupted by the opening of contact 2*a*333. Relay 2S is however held over its winding I in the circuit 114. Furthermore, after the closing of contact 2*a*274, relay 2R again energizes in the following circuit:

(135) +, 2*t*277, 2*a*274, 2*h*270, 2WI, 2*s*268, 2RI, —

The first step of the seventh decade is marked by way of contacts of this relay:

(136) —, W*i*294, 2*v*293, 2*ba*297, 2*s*298, 2*c*313, G*r*315, 2*r*316, 2*w*318 (first step of the seventh decade)

The first step of the seventh decade is marked in order to stop the selector at this step, provided that all outlets of the sixth decade are busy. If the selector is stopped at this step, a switching criterion is for this purpose released by means of the relay 2B*a*, which causes the transmission of a busy signal to the subscriber.

Attention may at this point be called to the relay 2R of the counting chain which is, depending upon the transmission relay 2A energized always during the interval from the conclusion of an even numbered current impulse to the end of an odd current impulse. The conclusion of a current impulse is thereby marked by energization of the transmission relay 2A and the start of a current impulse is marked by restoration of such relay.

Further two cases will now be briefly explained in order to show that the switching-over of the marking circuit to the marker line leading to the first contact of the next decade, in any desired decade, takes place after the marking of the desired decade, that is, as soon as the wipers of the group selector leave the bank contacts of the first line of the marked decade. It shall be assumed that, in the first case, the eighth decade is marked by the receiving number 8 or by eight current pulses, while in the second case, the tenth decade is marked by the number 0 or ten current impulses.

In the first case, at the conclusion of the eighth current impulse, the two relays 2T, 2W of the counting chain will be energized. These relays remain actuated in the following holding circuits:

(136*a*) +, 2*c*339, 2*t*334, 2TII, —

(136*b*) +, 2*c*339, 2*w*335, 2WII

Relays 2P*a* and 2A and relays 2R and 2S have restored. The marker line of the setting set of the first group selector is switched through in the circuit:

(136*c*) —, W*i*294, 2*v*293, 2*ba*297, 2*s*299, 2*t*314, G*r*315, 2*r*317, 2*w*320, marker line 138, wiper *d*120, 2*cg*111, wiper 2*m*217, 2*d*218, 2P*a*I, +

Relay 2P*a* energizes in this circuit. Test relay 2P*a* restores responsive to the wipers of the group selector leaving the first step of this decade. This results in the energization of relay 2A in series with relay 2C, the latter switching-in relay 2R of the counting chain and, since relays 2R, 2T and 2W are energized, switching the marking circuit to the marker line 139. The marker circuit extends:

(136*d*) —, W*i*294, 2*v*293, 2*ba*297, 2*s*299, 2*t*314, 2*c*313, G*r*300, 2*r*302, 2*t*307, 2*w*309, marker line 139, wiper *d*120, 2*cg*111, wiper 2*m*217, 2*d*218, 2P*a*I, +

The first step of the decade 9 is thereby marked as an overrun position.

In the second case, relays 2S, 2T, 2W will be energized at the conclusion of the tenth current step. The marker circuit for the decade 0 extends:

(136*e*) —, W*i*294, 2*v*293, 2*ba*297, 2*s*298, G*r*300, 2*r*301, 2*t*303, 2*w*305, marker line 130, wiper *d*120, 2*cg*111, wiper 2*m*217, 2*d*218, 8P*a*I, +

Test relay 2P*a* deenergizes again when the wipers of the group selector leave this step, thereby again causing energization of relay 2A in series with relay 2C. Relay 2A now connects relay 2R again, thereby switching the marker circuit in addition to marker line 139 also to the marker line 137:

(136*f*) —, W*i*294, 2*v*293, 2*ba*297, 2*s*298, 2*c*313, G*r*315, 2*r*316, 2*w*318, line 137, wiper *d*120, 2*cg*111, wiper 2*m*217, 2*d*218, 2P*a*I, +

The switching over from the marker line 137 to the marker line 131 which is allotted to decade 1 is effected by closure of contact 2*a*311 which interconnects the two marker lines. The first step of the decade "1" following the decade "0" is thus marked again.

The description will now again return to the originally assumed case according to which the decade 6 was marked by a current impulse series consisting of six current impulses. When the wipers of the first group selector leave the first step of the decade, the test relay 2P*b* in the setting set will take the place of the test relay 2P*a*.

However, as soon as the selector tests an idle succeeding connecting device, the test relay 2P*b* is energized in accordance with the circuit 132 and by opening its contact 2*pb*205, disconnects the starting relay 2A*n* (cf. circuit 123). By closing contact 2*pb*260, both field coils 2N*a* and 2N*b* are connected with each other and thus simultaneously energized so that the selector is stopped at the step reached. By closing the contact 2*pb*227, the auxiliary test relay 2P*h* is connected in parallel to the winding II of test relay 2P*b* in circuit 133 and is energized. After closing its contacts 2*ph*223 and 2*ph*226, the test relay 2P*b* and the auxiliary test relay 2P*h* hold themselves in the following circuit:

(137) +, 2*c*231, 2*ba*228, 2*ph*226, 2P*h*I, 2P*b*I, 2*ph*223, 2*m*221-arm, *c*119-arm, *c*123-wire, . . ., —

By the closing of contact 2*ph*331, relay 2V is connected by way of its windings I and II and, after the closing of its contact 2*v*332, holds itself over its winding II in the following circuit:

(138) +, 2*ph*331, 2*v*332, 2VII, —

Upon restoration of the starting relay 2A*n*, the relay 2E is also disconnected, this relay releasing with delayed action due to the short-circuiting of its winding I. Upon closing of the contact 2*v*292, the seizure relay 2C*g* of the first group selector is energized:

(139) +, 2*d*254, 2*m*256-arm, 2*nb*114, 2C*g*II, G*r*115, *ds*291 conductor, 2*v*292, W*i*294, —

If however cam contact 2*nb*113 is closed rather than cam contact 2*nb*114, as assumed in this circuit then the circuit for the energization of relay 2C*g* via this cam contact and contact 2*v*261 is closed.

After actuation of relay 2C*g*, the line wiper contact magnet 2A*d* of the group selector is energized by the closing of contact 2*cg*110:

(140) +, 2*v*220, 2*d*219, 2*d*218, 2*m*217, 2*cg*110, 2A*d*, —

Furthermore, by the opening of contact 2*cg*107, the holding circuit for relay 2G (cf. circuit 122) is interrupted and by the closing of contact 2*cg*106, the transmission of a criterion signifying the long-distance call is prepared by applying negative voltage to the 105*d* conductor. The opening contact 2*cg*116 prevents the transmission of the busy criterion by applying voltage to the 103*b* conductor. The test relays 2P*b* and 2P*h* are short-circuited over contact 2*cg*112 and thereby caused to deenergize. Upon release of relay 2G, voltage is upon making a long-distance connection applied to the 105*d* conductor over contact 2*g*215:

(141) —, 2*f*216, 2*g*215, 2*u*210, 2*ba*209, 2*m*208-arm, 2*cg*106, 105*d*-wire, . . .

By this long-distance criterion, a relay 1F in the preceding connecting device (Fig. 1) which characterizes the long-distance call is excited over the 105*d* conductor, contact 1*f*33 of such relay marking the subscriber line as "busy with long distance call."

After release of test relay 2P*b* and of the auxiliary test relay 2P*h* of the setting set, relay 2V is disconnected via contact 2*ph*331 (cf. circuit 138) which relay, due to the short-circuiting of its winding I via contact 2*v*332 restores with time delay. During the restoration of relay 2V, relay 2D deenergizes, this relay having been disconnected upon the release of relay 2E by the opening of the contact 2*e*286. By the opening of contact 2*d*218, the energization circuit for the line wiper contact magnet 2A*d* is interrupted, such magnet being held in series with the winding I of the seizure relay 2C*g* via the 104*c* conductor of the preceding connecting device:

(142) +, . . ., 104*c*-wire, 2*cg*109, 2C*g*I, 2A*d*, —

By the opening of contact 2*d*237, the holding circuit for relays 2A and 2C (cf. of circuit 134) is furthermore opened, so that both restore. The field coils 2N*a* and 2N*b* are disconnected by the opening of the contact 2*d*254. Likewise, by the opening of contact 2*d*254, the energizing circuit for the seizure relay 2C*g* is interrupted, which relay however, as already mentioned, is held in accordance with circuit 142 for the supply transformation. As soon as relay 2C restores, the long-distance characterizing relay 2F and the still energized relays of the relay counting chain are disconnected. After the delayed release of relay IV, the holding circuit for relay 2K is interrupted by the opening of contact 2*v*281, so that said relay restores and by closing contact 2*k*202 closes the starting line 200*an*1 for the starting relay 2A*n*. The setting set is thus, after the release of relay 2K, again ready to be seized for another call.

If all lines of the sixth decade are busy, the testing relay 2P*b* cannot energize. The selector is however stopped on the first step of the succeeding seventh decade by energization of the test relay 2P*a* in the following circuit:

(143) +, 2P*a*I, 2*d*218, 2*m*217-arm, 2*cg*111, *d*120-arm, 137-wire, 2*w*318, 2*r*316, G*r*315, 2*c*313, 2*s*298, 2*ba*297, 2*v*293, W*i*294, —

By the closing of contact 2*pa*264, the two field coils 2N*a*, 2N*b* are connected with each other and the selector is stopped by simultaneous energization of these two field coils. By the closing of contact 2*pa*243, relay 2B*a* is energized:

(144) +, 2*pa*243, 2*d*242, 2*a*240, 2P*a*II, 2B*a*, —

By the closing of contact 2*ba*296, voltage is connected as busy criterion to the 103*b* conductor:

(145) —, W*i*294, 2*v*293, 2*ba*296, 2*m*295-arm, 2*cg*116, 103*b* conductor, . . .

In the preceding battery feed transmission, the transmission of a busy signal to the calling subscriber is released by this busy criterion as already explained. The energizing circuit of test relay 2P*a* (cf. circuit 143) is interrupted by the opening of contact 2*ba*297 while at the same time winding I of test relay 2P*a* is short-circuited over contact 2*ba*229. The test relay, however, does not restore since it is held, via its winding II in the circuit 144. Furthermore, by the opening of contact 2*ba*209, relay 2G (cf. circuit 122) is disconnected. Relay 2G, by opening its contact 2*g*204 disconnects the starting relay 2A*n* which in its turn causes relay 2E to restore with time delay. After the restoration of relay 2E, relay 2D is disconnected by the opening of contact 2*e*286. After the delayed release of relay 2D, the relays 2C and 2A restore, as already mentioned. Furthermore, the relays 2P*a* and 2B*a* are disconnected by the opening of contact 2*d*242. After the release of relay 2B*a*, the transmission of the busy criterion (cf. circuit 145) is terminated. After the release of relay 2C, the relays of the relay counting chain restore, which in their turn disconnect relay 2K. The setting set after the release of relay 2K is again in normal position and can again be seized.

The release of the first group selector is effected by disconnecting ground potential from conductor 104*c* in the battery feed transmission. As a result, the seizure relay 2C*g* and the line wiper control magnet 2A*d* deenergize.

The setting of the further selection stages, such as second and third group selectors, is effected in a similar manner to the setting of the first group selector. It is not essential for an understanding of the invention and description thereof is therefore omitted. Explanations as to the setting of the connector to the desired subscriber line are omitted for similar reasons.

Changes may be made within the scope and spirit of the appended claims which define what is believed to be new and desired to have protected by Letters Patent.

I claim:

1. A circuit arrangement for controlling the operation of switches employed in a communication system for extending calls and having serially related groups of bank contacts, each group of which has a group contact, and being operative to hunt for an idle line extending from bank contacts in a contact group marked by a setting device which comprises a relay chain for counting incoming impulses, said circuit arrangement comprising switching means operatively controlled by said relay chain after the marking of a desired bank contact group for automatically switching the marking circuit locally to the group contact of the next successive bank contact group for the purpose of causing the corresponding switch upon failing to find an idle line in a marked bank contact group to stop the hunting operation with the wiper thereof in engagement with the group marking bank contact associated with the next successive bank contact group.

2. A circuit arrangement according to claim 1, comprising an impulse transmitting relay for locally producing after the marking of the desired contact group an impulse for said relay counting chain to alter the operating condition thereof for the purpose of effecting in said setting device the switching of the marking circuit to the group marking contact of a contact group following the desired contact group.

3. A circuit arrangement according to claim 2, wherein said locally produced impulse is effective to alter the operating condition of the first relay in the chain of said counting relays.

4. A circuit arrangement according to claim 2, comprising a contact pyramid formed by said counting chain for the marking of the group contacts, said impulse transmitting relay being operative to directly effect switching over of the marker lines within said contact pyramid.

5. A circuit arrangement according to claim 2, wherein said local impulse for said relay chain corresponds to an impulse pause of the incoming selection pulses, an impulse receiving relay, said impulse receiving relay producing said impulse by operating as a testing relay with respect to the marked group contact of the desired contact group.

6. A circuit arrangement according to claim 5, wherein said impulse receiving relay deenergizes in the event of busy condition of the line connected to the group contact of the desired contact group and after the corresponding switch wiper has left such group contact, such deenergization effecting operative connection of said impulse transmitting relay.

7. A circuit arrangement according to claim 5, comprising a contact pyramid formed by said counting chain for the marking of the group contacts, and an auxiliary relay operatively controlled by said impulse transmitting relay for bridging the first stages of the contacts forming said pyramid.

No references cited.